O. H. JEWELL.
APPARATUS FOR MAKING ARTIFICIAL ICE.
APPLICATION FILED FEB. 25, 1909.
934,732.
Patented Sept. 21, 1909.
4 SHEETS—SHEET 1.
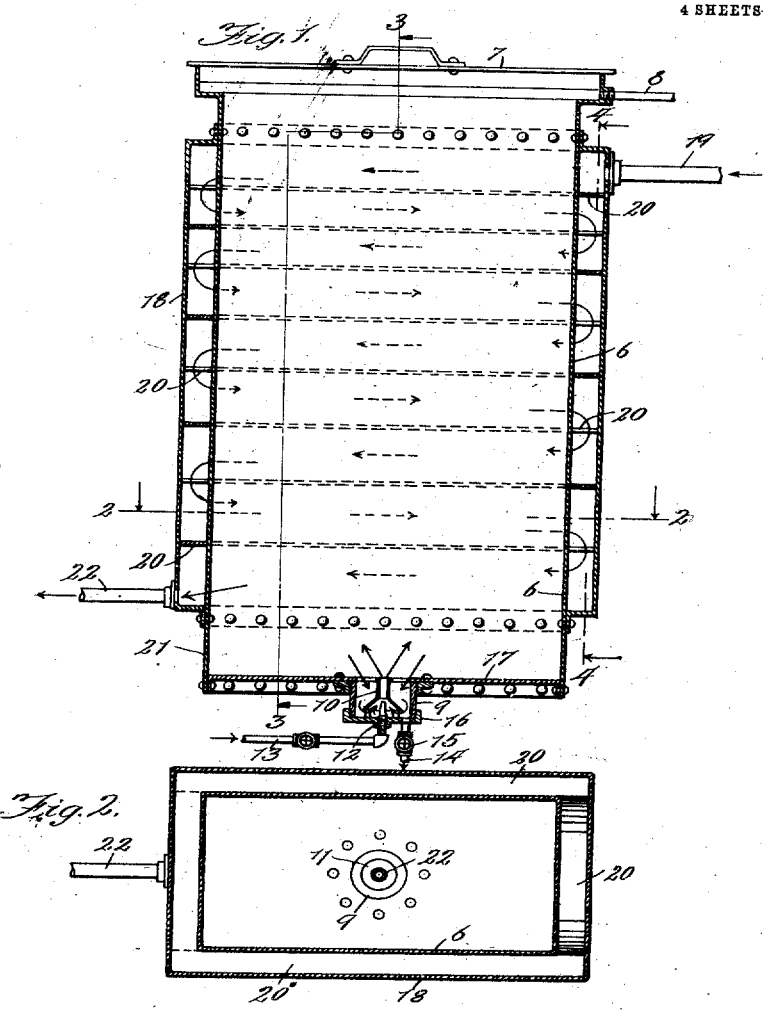
WITNESSES:
INVENTOR.
Omar H. Jewell
BY
Bond Adams Pickard Jackson
his ATTORNEYS.

O. H. JEWELL.
APPARATUS FOR MAKING ARTIFICIAL ICE.
APPLICATION FILED FEB. 25, 1909.
934,732.
Patented Sept. 21, 1909.
4 SHEETS—SHEET 2.
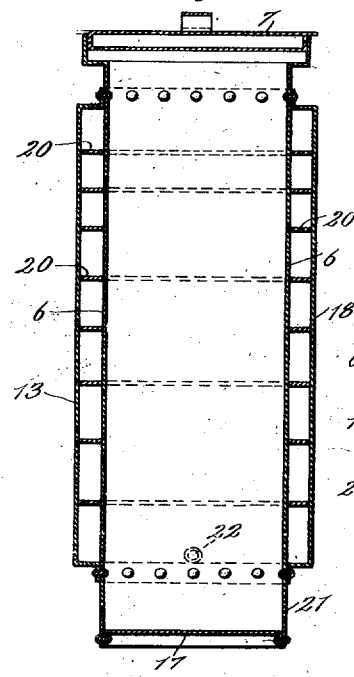
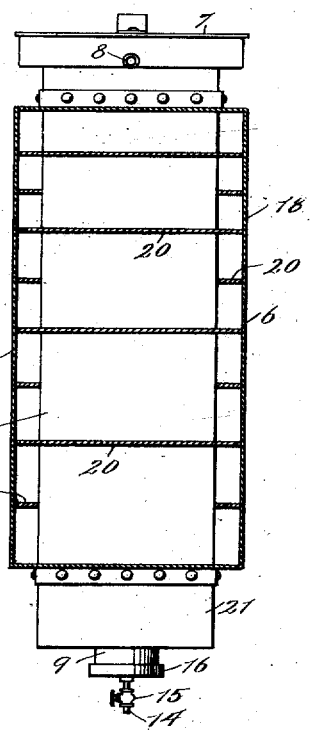
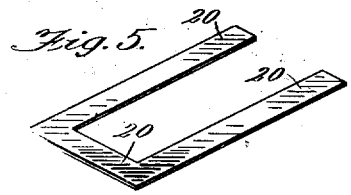

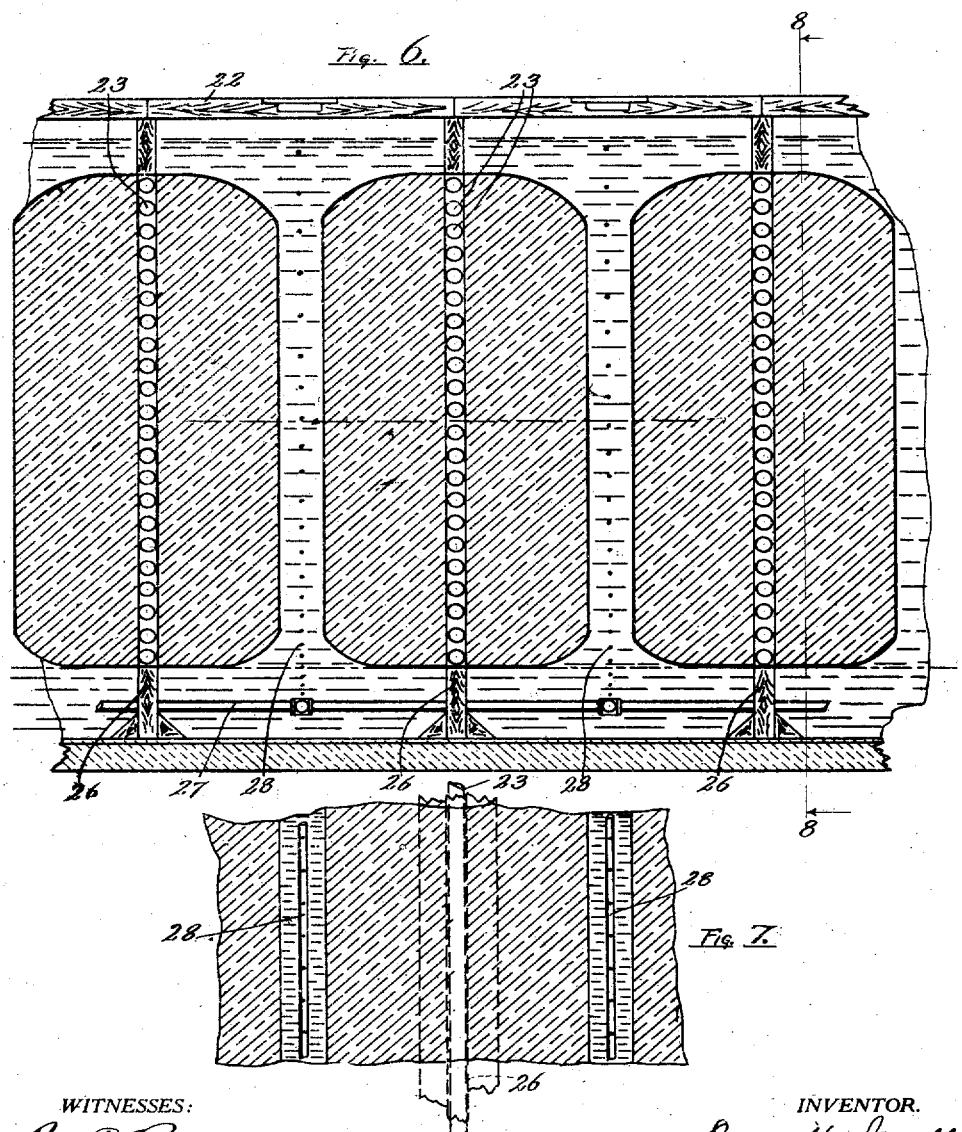

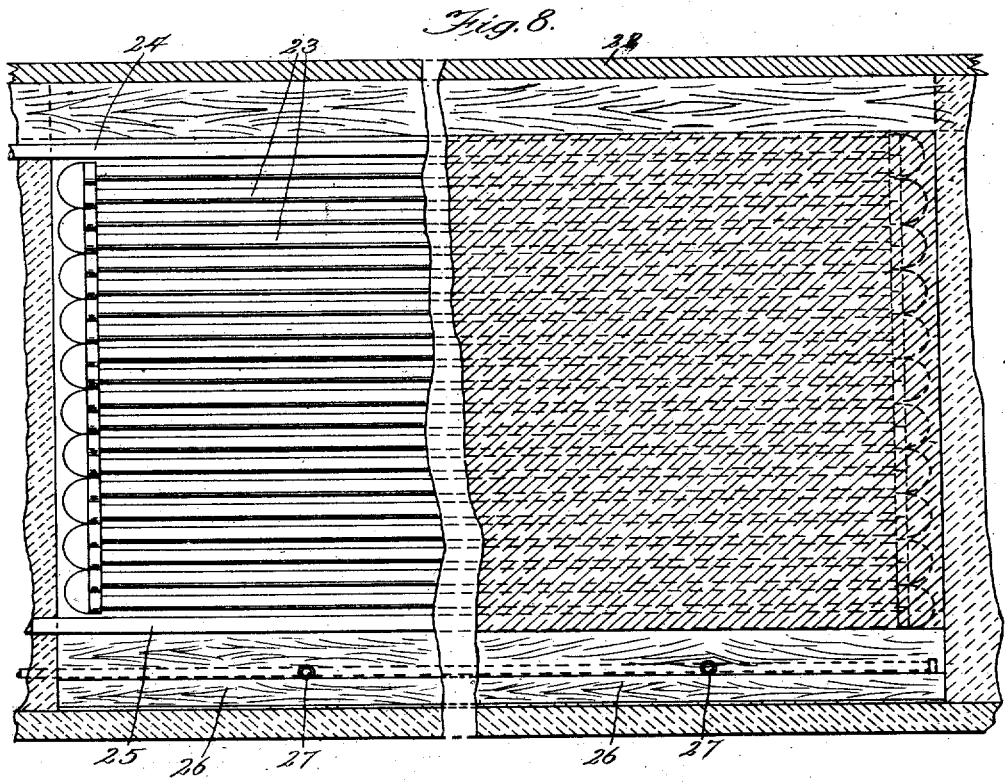

UNITED STATES PATENT OFFICE.

OMAR H. JEWELL, OF CHICAGO, ILLINOIS, ASSIGNOR TO POLAR ICE MACHINE COMPANY, OF CHICAGO, ILLINOIS, A CORPORATION OF ILLINOIS.

APPARATUS FOR MAKING ARTIFICIAL ICE.

934,732.      Specification of Letters Patent.      Patented Sept. 21, 1909.

Application filed February 25, 1909. Serial No. 430,012.

*To all whom it may concern:*

Be it known that I, OMAR H. JEWELL, a citizen of the United States, residing at Chicago, in the county of Cook and State of Illinois, have invented certain new and useful Improvements in Apparatus for Making Artificial Ice, of which the following is a specification, reference being had to the accompanying drawings.

My invention relates to the manufacture of artificial ice from raw water, and has more particularly to do with apparatus for manufacturing artificial ice according to the method described in my pending application, Serial No. 438,373, filed June 13, 1908.

The method of freezing referred to, generally speaking, consists in applying a freezing medium to the upper portion only of a suitable receptacle, thereby maintaining a non-freezing zone of water below the forming ice, and causing the water in the receptacle to circulate by introducing air thereinto through or adjacent to such non-freezing zone. The circulation of the water during the freezing period is best effected by introducing through the non-freezing zone compressed air which rises through the water, thereby causing the water to circulate and maintaining the lighter impurities and air bubbles therein in a state of motion so that they do not adhere to the faces of the forming mass of ice and consequently are not frozen into the ice block. The heavier impurities may settle down into the non-freezing zone, where they remain until the freezing operation is completed.

In the accompanying drawings, which illustrate two forms of apparatus by which the process referred to may be carried into effect,—Figure 1 is a longitudinal vertical section of a form of apparatus designed for freezing according to what is known as the "can system," the water to be frozen being contained in a can or receptacle of the shape of the block of ice to be formed, and practically the entire mass of water in the receptacle being frozen to form the finished block; Fig. 2 is a cross-section on line 2—2 of Fig. 1; Fig. 3 is a vertical section on line 3—3 of Fig. 1; Fig. 4 is a vertical section on line 4—4 of Fig. 1; Fig. 5 is a perspective view of one of the damper plates or diaphragms which control the direction of flow of the brine; Fig. 6 is a partial longitudinal sectional view, showing an apparatus designed to be employed for freezing ice according to what is known as the "plate system," using my improved method; Fig. 7 is a partial horizontal section on line 7—7 of Fig. 6; and Fig. 8 is a partial cross-section on line 8—8 of Fig. 6.

Referring first to the construction shown in Figs. 1 to 5, inclusive,—6 indicates a tank or receptacle in which is placed the water to be frozen. As shown in Fig. 1, the extreme upper end of said tank is of somewhat greater diameter and is fitted with a cover 7. It is also provided with an overflow pipe 8, as shown in Fig. 1. 9 indicates a well at the bottom of the tank 6, in which is provided a tube 10 having an inverted funnel or flaring portion 11 at its lower end into which projects an injector-nozzle 12 connected to an air-pipe 13. The well 9 is also provided with a drain-pipe 14 having a valve 15, as shown in Fig. 1. Preferably the pipe 10, injector-nozzle 12 and drain-pipe 14 are all carried by a detachable cap or head 16 so that they may be readily removed. The pipe 10 is preferably placed centrally in the well 9, which is centrally disposed relatively to the bottom 17 of the tank. Thus it will be seen that the water in the tank fills the well 9 and that by injecting air into the pipe 10 the water in the well may flow up between the nozzle 12 and the funnel 11, being carried with the incoming air up into the tank, thereby forming a current of water having air intermingled therewith which flows up through the tank and agitates or circulates the water therein. The violence of the movement of the water depends upon the air pressure and ordinarily is sufficient to cause the water in the tank to maintain a pronounced circulation. The pipe 13 is supplied with compressed air from any suitable source of supply. The tank 6 is surrounded by a jacket 18, except at the extreme upper and lower portions thereof, and said jacket is provided at its upper end with an inlet pipe 19 and at its lower end with an outlet pipe 22, through which brine or other freezing fluid is caused to flow into and out of the jacket and around the tank 6. The brine is cooled by any suitable refrigerating apparatus, such as an ammonia compressor and coils. For the purpose of controlling the flow of brine around the tank 6 the jacket 18 is provided with a series of plates or diaphragms 20 which are preferably of the shape shown in Fig. 5, being, in the construction shown, U-shaped so that they extend across one end and the two sides of the tank 6. The plates are arranged so as to extend alternately in opposite directions, as best shown in Figs. 1 and 4, so that the brine admitted through the pipe 19 is compelled to flow to the opposite end of the tank 6 before it can pass down to the next stratum, flowing back and forth as it progresses downward, as indicated by the arrows in Fig. 1. It will be noted also that the lower portion of the tank 6 extends down a considerable distance below the lower portion of the jacket 18, as shown at 21 in the drawings. This downwardly-extending portion of the tank is exposed to atmospheric temperature and is not exposed to the brine, so that it constitutes the non-freezing zone of the can or tank, substantially no ice being formed therein, the water in the bottom of the can being always in a fluid condition. This portion of the can also forms a reservoir in which the solids separated from the freezing water, as well as the impurities expelled by the forming ice, gradually accumulate so that they remain separated from the ice and are held in a state of suspension to a greater or less extent by the water contained in the bottom of the can. Furthermore, this unfrozen body of water serves as a medium through which the air admitted to the water to be frozen is introduced without subjecting it to a freezing temperature, thus avoiding the danger of clogging the air pipes by freezing of the moisture naturally contained in the air, as would be the case if the air pipe were exposed to the cold brine, or were in contact with the water in the can at a low temperature. By this means I also avoid freezing the air pipe into the block of ice, as would be the result if the air pipe were extended into the freezing chamber, and in addition I avoid the use of mechanical devices within the freezing tank or can, which is objectionable for the same and other practical reasons.

In Figs. 6, 7 and 8 I have shown an apparatus designed to carry out my process in connection with the manufacture of ice according to the plate system. As therein shown, 22 indicates a tank of suitable dimensions and shape adapted to contain the water to be frozen. 23 indicates a series of coils adapted to contain ammonia, or other freezing agent, and supplied therewith from any suitable source. In Fig. 8 I have shown said coils as being provided with pipes 24—25 through which the circulation of ammonia, or other freezing agent, is maintained. As best shown in Figs. 6 and 8, the coils 23 are placed transversely in the tank 22 and are elevated a short distance above the floor thereof, being preferably supported by transverse beams 26. Thus a zone of water is provided in the tank which lies below the freezing influence of the refrigerating agent in the coils, thus forming the non-freezing zones hereinbefore referred to. The several coils 23 are placed at such distances apart that the ice may form upon them and grow laterally toward the mass of ice forming on the next adjacent coils at either side, in the manner shown in Fig. 6. For the purpose of maintaining the water in the tank in a state of circulation, air pipes 27 are provided in the non-freezing zone at the bottom of the tank, said pipes being provided with transversely-extending perforated pipes 28, as shown in Fig. 7, through which the air may escape into the water in the tank. The transverse pipes 28 are placed substantially centrally between adjacent coils 23, as shown in Fig. 6, so that the bubbles of air rise in planes about midway between the successive coils, thus maintaining a substantially uniform circulation throughout the tank.

Heretofore in making ice by the plate system it has been the practice to apply the freezing temperature to the full depth of the entire body of water, the freezing plates or coils extending to the floor of the tank containing them, so that when frozen the mass of ice extended to the bottom of the tank, thus freezing in all the impurities and making it necessary to remove a large part of the ice at the bottom of each block in order to get rid of such impurities. By the use of my improved apparatus, however, I avoid this objection, thereby securing a considerable per cent. more of merchantable ice than it has been possible to secure by the use of any prior apparatus of which I am aware.

So far as I am aware, I am the first in the art to provide for maintaining in the water receptacle a body of unfrozen water in a zone below the forming ice and causing the water in the receptacle to circulate by introducing air thereinto through the water in or adjacent to such non-freezing zone, and the claims hereinafter made are, therefore, to be construed accordingly.

That which I claim as my invention, and desire to secure by Letters Patent, is,—

1. An ice-making apparatus, comprising a receptacle adapted to contain water, means for applying a freezing medium to the upper portion of said receptacle, means for maintaining the lower portion thereof at a non-freezing temperature, thereby maintaining a non-freezing zone of water in said receptacle below the forming ice, and means for causing the water in said receptacle to circulate as freezing progresses.

2. An ice-making apparatus, comprising a receptacle adapted to contain water, means for applying a freezing medium to the upper portion of said receptacle, means for maintaining the lower portion thereof at a non-freezing temperature, thereby maintaining a non-freezing zone of water in said receptacle below the forming ice, and means for introducing compressed air into the water through said non-freezing zone.

3. An ice-making apparatus, comprising a receptacle adapted to contain water, means for applying a freezing medium to the upper portion of said receptacle, means for maintaining the lower portion thereof at a non-freezing temperature, thereby maintaining a non-freezing zone of water in said receptacle below the forming ice, and an external air-pipe connected with said lower portion of the receptacle.

4. An ice-making apparatus, comprising a receptacle adapted to contain water, a jacket surrounding the upper portion of said receptacle, the lower portion thereof projecting below said jacket, means for conducting a freezing medium to and from said jacket, and means for introducing air into said receptacle.

5. An ice-making apparatus, comprising a receptacle adapted to contain water, a jacket surrounding the upper portion of said receptacle, the lower portion thereof projecting below said jacket, means for conducting a freezing medium to and from said jacket, and means for introducing air into said receptacle below said jacket.

OMAR H. JEWELL.

Witnesses:
JOHN L. JACKSON,
MINNIE A. HUNTER.

DISCLAIMER.

934,732.—*Omar H. Jewell*, Chicago, Ill. APPARATUS FOR MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified as follows, to wit:

"The construction illustrated in Figs. 6, 7, and 8 of the drawings and described in the specification in the following words:

"Fig. 6 is a partial longitudinal sectional view, showing an apparatus designed to be employed for freezing ice according to what is known as the 'plate system,' using my improved method; Fig. 7 is a partial horizontal section on line 7—7 of Fig. 6; and Fig. 8 is a partial cross-section on line 8—8 of Fig. 6.

"In Figs. 6, 7, and 8 I have shown an apparatus designed to carry out my process in connection with the manufacture of ice according to the plate system. As therein shown, 22 indicates a tank of suitable dimensions and shape adapted to contain the water to be frozen. 23 indicates a series of coils adapted to contain ammonia, or other freezing agent, and supplied therewith from any suitable source. In Fig. 8 I have shown said coils as being provided with pipes 24—25 through which the circulation of ammonia, or other freezing agent, is maintained. As best shown in Figs. 6 and 8, the coils 23 are placed transversely in the tank 22 and are elevated a short distance above the floor thereof, being preferably supported by transverse beams 26. Thus a zone of water is provided in the tank which lies below the freezing influence of the refrigerating agent in the coils, thus forming the non-freezing zones hereinbefore referred to. The several coils 23 are placed at such distances apart that the ice may form upon them and grow laterally toward the mass of ice forming on the next adjacent coils at either side, in the manner shown in Fig. 6. For the purpose of maintaining the water in the tank in a state of circulation, air pipes 27 are provided in the non-freezing zone at the bottom of the tank, said pipes being provided with transversely-extending perforated pipes 28, as shown in Fig. 7, through which the air may escape into the water in the tank. The transverse pipes 28 are placed substantially centrally between adjacent coils 23, as shown in Fig. 6, so that the bubbles of air rise in planes about midway between the successive coils, thus maintaining a substantially uniform circulation throughout the tank.

"Heretofore in making ice by the plate system it has been the practice to apply the freezing temperature to the full depth of the entire body of water, the freezing plates or coils extending to the floor of the tank containing them, so that when frozen the mass of ice extended to the bottom of the tank, thus freezing in all the impurities and making it necessary to remove a large part of the ice at the bottom of each block in order to get rid of such impurities. By the use of my improved apparatus, however, I avoid this objection, thereby securing a considerable per cent. more of merchantable ice than it has been possible to secure by the use of any prior apparatus of which I am aware." [*Official Gazette, May 27, 1913.*]

ceptacle below the forming ice, and means for introducing compressed air into the water through said non-freezing zone.

3. An ice-making apparatus, comprising a receptacle adapted to contain water, means for applying a freezing medium to the upper portion of said receptacle, means for maintaining the lower portion thereof at a non-freezing temperature, thereby maintaining a non-freezing zone of water in said receptacle below the forming ice, and an external air-pipe connected with said lower portion of the receptacle.

4. An ice-making apparatus, comprising a receptacle adapted to contain water, a jacket surrounding the upper portion of said receptacle, the lower portion thereof projecting below said jacket, means for conducting a freezing medium to and from said jacket, and means for introducing air into said receptacle.

5. An ice-making apparatus, comprising a receptacle adapted to contain water, a jacket surrounding the upper portion of said receptacle, the lower portion thereof projecting below said jacket, means for conducting a freezing medium to and from said jacket, and means for introducing air into said receptacle below said jacket.

OMAR H. JEWELL.

Witnesses:
JOHN L. JACKSON,
MINNIE A. HUNTER.

DISCLAIMER.

934,732.—*Omar H. Jewell*, Chicago, Ill. APPARATUS FOR MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified as follows, to wit:

"The construction illustrated in Figs. 6, 7, and 8 of the drawings and described in the specification in the following words:

"Fig. 6 is a partial longitudinal sectional view, showing an apparatus designed to be employed for freezing ice according to what is known as the 'plate system,' using my improved method; Fig. 7 is a partial horizontal section on line 7—7 of Fig. 6; and Fig. 8 is a partial cross-section on line 8—8 of Fig. 6.

"In Figs. 6, 7, and 8 I have shown an apparatus designed to carry out my process in connection with the manufacture of ice according to the plate system. As therein shown, 22 indicates a tank of suitable dimensions and shape adapted to contain the water to be frozen. 23 indicates a series of coils adapted to contain ammonia, or other freezing agent, and supplied therewith from any suitable source. In Fig. 8 I have shown said coils as being provided with pipes 24—25 through which the circulation of ammonia, or other freezing agent, is maintained. As best shown in Figs. 6 and 8, the coils 23 are placed transversely in the tank 22 and are elevated a short distance above the floor thereof, being preferably supported by transverse beams 26. Thus a zone of water is provided in the tank which lies below the freezing influence of the refrigerating agent in the coils, thus forming the non-freezing zones hereinbefore referred to. The several coils 23 are placed at such distances apart that the ice may form upon them and grow laterally toward the mass of ice forming on the next adjacent coils at either side, in the manner shown in Fig. 6. For the purpose of maintaining the water in the tank in a state of circulation, air pipes 27 are provided in the non-freezing zone at the bottom of the tank, said pipes being provided with transversely-extending perforated pipes 28, as shown in Fig. 7, through which the air may escape into the water in the tank. The transverse pipes 28 are placed substantially centrally between adjacent coils 23, as shown in Fig. 6, so that the bubbles of air rise in planes about midway between the successive coils, thus maintaining a substantially uniform circulation throughout the tank.

"Heretofore in making ice by the plate system it has been the practice to apply the freezing temperature to the full depth of the entire body of water, the freezing plates or coils extending to the floor of the tank containing them, so that when frozen the mass of ice extended to the bottom of the tank, thus freezing in all the impurities and making it necessary to remove a large part of the ice at the bottom of each block in order to get rid of such impurities. By the use of my improved apparatus, however, I avoid this objection, thereby securing a considerable per cent. more of merchantable ice than it has been possible to secure by the use of any prior apparatus of which I am aware." [*Official Gazette, May 27, 1913.*]

DISCLAIMER.

934,732.—*Omar H. Jewell*, Chicago, Ill. APPARATUS FOR MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified as follows, to wit:

"The construction illustrated in Figs. 6, 7, and 8 of the drawings and described in the specification in the following words:

"Fig. 6 is a partial longitudinal sectional view, showing an apparatus designed to be employed for freezing ice according to what is known as the 'plate system,' using my improved method; Fig. 7 is a partial horizontal section on line 7—7 of Fig. 6; and Fig. 8 is a partial cross-section on line 8—8 of Fig. 6.

"In Figs. 6, 7, and 8 I have shown an apparatus designed to carry out my process in connection with the manufacture of ice according to the plate system. As therein shown, 22 indicates a tank of suitable dimensions and shape adapted to contain the water to be frozen. 23 indicates a series of coils adapted to contain ammonia, or other freezing agent, and supplied therewith from any suitable source. In Fig. 8 I have shown said coils as being provided with pipes 24—25 through which the circulation of ammonia, or other freezing agent, is maintained. As best shown in Figs. 6 and 8, the coils 23 are placed transversely in the tank 22 and are elevated a short distance above the floor thereof, being preferably supported by transverse beams 26. Thus a zone of water is provided in the tank which lies below the freezing influence of the refrigerating agent in the coils, thus forming the non-freezing zones hereinbefore referred to. The several coils 23 are placed at such distances apart that the ice may form upon them and grow laterally toward the mass of ice forming on the next adjacent coils at either side, in the manner shown in Fig. 6. For the purpose of maintaining the water in the tank in a state of circulation, air pipes 27 are provided in the non-freezing zone at the bottom of the tank, said pipes being provided with transversely-extending perforated pipes 28, as shown in Fig. 7, through which the air may escape into the water in the tank. The transverse pipes 28 are placed substantially centrally between adjacent coils 23, as shown in Fig. 6, so that the bubbles of air rise in planes about midway between the successive coils, thus maintaining a substantially uniform circulation throughout the tank.

"Heretofore in making ice by the plate system it has been the practice to apply the freezing temperature to the full depth of the entire body of water, the freezing plates or coils extending to the floor of the tank containing them, so that when frozen the mass of ice extended to the bottom of the tank, thus freezing in all the impurities and making it necessary to remove a large part of the ice at the bottom of each block in order to get rid of such impurities. By the use of my improved apparatus, however, I avoid this objection, thereby securing a considerable per cent. more of merchantable ice than it has been possible to secure by the use of any prior apparatus of which I am aware." [*Official Gazette, May 27, 1913.*]